US011722561B2

(12) United States Patent
Westerlund et al.

(10) Patent No.: US 11,722,561 B2
(45) Date of Patent: Aug. 8, 2023

(54) DTLS/SCTP ENHANCEMENTS FOR RAN SIGNALING PURPOSES

(71) Applicant: Telefonaktiebolaget LM Ericsson (publ), Stockholm (SE)

(72) Inventors: Magnus Westerlund, Upplands Väsby (SE); John Mattsson, Täby (SE); Claudio Porfiri, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/449,659

(22) Filed: Sep. 30, 2021

(65) Prior Publication Data

US 2022/0201069 A1     Jun. 23, 2022

Related U.S. Application Data

(60) Provisional application No. 63/129,514, filed on Dec. 22, 2020.

(51) Int. Cl.
*H04L 67/1074* (2022.01)
*H04L 69/326* (2022.01)

(52) U.S. Cl.
CPC .......... *H04L 67/108* (2013.01); *H04L 69/326* (2013.01)

(58) Field of Classification Search
CPC ............................ H04L 67/108; H04L 69/326
USPC .................................................. 709/237, 238
See application file for complete search history.

(56) References Cited

U.S. PATENT DOCUMENTS

| | | | | |
|---|---|---|---|---|
| 6,985,454 | B1* | 1/2006 | Wiedeman | H04B 7/18589 370/316 |
| 9,525,718 | B2* | 12/2016 | Johnston | H04L 67/02 |
| 9,614,890 | B2* | 4/2017 | Waxman | H04L 65/65 |
| 9,832,123 | B2* | 11/2017 | Mosko | H04L 45/7453 |
| 9,912,705 | B2* | 3/2018 | Ezell | H04L 65/65 |
| 10,089,339 | B2* | 10/2018 | Liljedahl | H04L 47/36 |
| 10,218,682 | B1* | 2/2019 | Kawach | H04L 9/3242 |
| 10,355,999 | B2* | 7/2019 | Mosko | H04L 47/32 |
| 10,462,116 | B1* | 10/2019 | Sharifi Mehr | H04L 63/062 |
| 10,484,355 | B1* | 11/2019 | Levy | H04L 63/068 |
| 10,511,648 | B1* | 12/2019 | Belikovetsky | H04L 65/70 |

(Continued)

OTHER PUBLICATIONS

R. Seggelmann, "SCTP Strategies to Secure End-To-End Communication", Oct. 22, 2012 (Oct. 22, 2012), XP055113446, Retrieved from the Internet: https://duepublico2.unidue.de/servlets/MCRFileNodeServlet/duepublico_derivate_00031696/dissertation.pdf [retrieved on Apr. 10, 2014].

(Continued)

*Primary Examiner* — Thu Ha T Nguyen
(74) *Attorney, Agent, or Firm* — Nicholson De Vos Webster & Elliott LLP

(57) ABSTRACT

A method at a first node for encoding a message for secure transmission to a second node comprising. The method includes receiving the message for transmission to the second node and fragmenting the message into a plurality of fragments, wherein each fragment is of a selected size. The method further includes encoding separately each fragment of the plurality of fragments using Datagram Transport Layer Security (DTLS), combining DTLS encoded fragments into a Stream Control Transmission Protocol (SCTP) message, and transmitting the message as a plurality of DTLS encoded fragments in the SCTP message to the second node.

20 Claims, 10 Drawing Sheets

(56) References Cited

U.S. PATENT DOCUMENTS

| | | | | |
|---|---|---|---|---|
| 10,581,927 | B2* | 3/2020 | Ezell | H04L 12/1818 |
| 10,778,429 | B1* | 9/2020 | Rubin | H04L 9/0877 |
| 10,887,291 | B2* | 1/2021 | Davis | H04L 63/06 |
| 10,951,597 | B2* | 3/2021 | Rosenberg | H04L 67/01 |
| 11,100,197 | B1* | 8/2021 | Bernardi | H04L 9/3297 |
| 11,159,498 | B1* | 10/2021 | Casu | H04L 9/0825 |
| 11,632,439 | B2* | 4/2023 | Shribman | H04L 67/567 |
| | | | | 709/218 |
| 2003/0074445 | A1* | 4/2003 | Roach | H04L 69/12 |
| | | | | 709/224 |
| 2003/0074474 | A1* | 4/2003 | Roach | H04L 9/40 |
| | | | | 709/246 |
| 2008/0307528 | A1* | 12/2008 | Chen | H04L 63/0428 |
| | | | | 709/230 |
| 2011/0214157 | A1* | 9/2011 | Korsunsky | H04L 63/1425 |
| | | | | 726/1 |
| 2011/0231510 | A1* | 9/2011 | Korsunsky | G06F 21/55 |
| | | | | 709/213 |
| 2011/0231564 | A1* | 9/2011 | Korsunsky | H04L 63/1483 |
| | | | | 709/231 |
| 2011/0238855 | A1* | 9/2011 | Korsunsky | H04L 63/1441 |
| | | | | 709/231 |
| 2014/0245453 | A1* | 8/2014 | Himawan | H04L 63/123 |
| | | | | 726/26 |
| 2015/0067819 | A1* | 3/2015 | Shribman | H04L 65/612 |
| | | | | 709/218 |
| 2016/0269365 | A1* | 9/2016 | Reddy | H04L 9/0822 |
| 2016/0286006 | A1* | 9/2016 | Klaghofer | G06F 8/65 |
| 2016/0366206 | A1* | 12/2016 | Shemer | G06F 9/54 |
| 2017/0054770 | A1* | 2/2017 | Wells | H04L 65/65 |
| 2017/0063716 | A1* | 3/2017 | Marjou | H04L 65/80 |
| 2018/0007172 | A1* | 1/2018 | Wang | H04L 67/54 |
| 2018/0019978 | A1* | 1/2018 | Reddy | H04L 63/0245 |
| 2018/0124126 | A1* | 5/2018 | Doree | H04L 65/1104 |
| 2018/0167808 | A1* | 6/2018 | Somaraju | H04L 63/065 |
| 2018/0255110 | A1* | 9/2018 | Dowlatkhah | H04L 65/1016 |
| 2018/0316732 | A1* | 11/2018 | Belling | H04L 65/1089 |
| 2019/0190891 | A1* | 6/2019 | Pillai | H04L 63/0428 |
| 2019/0372943 | A1* | 12/2019 | Stephan | H04L 63/0428 |
| 2021/0400537 | A1* | 12/2021 | Zhang | H04L 47/30 |
| 2021/0409335 | A1* | 12/2021 | Zhu | H04L 47/24 |
| 2022/0014553 | A1* | 1/2022 | Dutta | H04L 65/61 |
| 2022/0103525 | A1* | 3/2022 | Shribman | G06F 16/955 |
| 2022/0107994 | A1* | 4/2022 | Bernardi | G06F 21/105 |
| 2022/0116319 | A1* | 4/2022 | Dutta | H04L 12/4633 |
| 2022/0116334 | A1* | 4/2022 | Zhu | H04L 47/622 |
| 2022/0150691 | A1* | 5/2022 | Teyeb | H04L 63/123 |
| 2022/0159433 | A1* | 5/2022 | Flinck | H04W 12/06 |
| 2022/0201069 | A1* | 6/2022 | Westerlund | H04L 63/166 |
| 2022/0272699 | A1* | 8/2022 | Zhuo | H04W 72/27 |

OTHER PUBLICATIONS

S. Bradner, "Key words for use in RFCs to Indicate Requirement Levels," Mar. 1997, 3 pages, Network Working Group, RFC 2119.

A. Jungmaier et al., "Transport Layer Security over Stream Control Transmission Protocol," Dec. 2002, 9 pages, Network Working Group, RFC 3436, The Internet Society.

R. Stewart, "Stream Control Transmission Protocol (SCTP) Partial Reliability Extension," May 2004, 22 pages, Network Working Group, RFC 3758, The Internet Society.

M. Tuexen et al., "Authenticated Chunks for the Stream Control Transmission Protocol (SCTP)," Aug. 2007, 19 pages, Network Working Group, RFC 4895.

R. Stewart, "Stream Control Transmission Protocol," Sep. 2007, 152 pages, Network Working Group, RFC 4960.

R. Stewart et al., "Stream Control Transmission Protocol (SCTP) Dynamic Address Reconfiguration," Sep. 2007, 41 pages, Network Working Group, RFC 5061.

T. Dierks et al., "The Transport Layer Security (TLS) Protocol Version 1.2," Aug. 2008, 104 pages, Network Working Group, RFC 5246.

E. Rescorla, "Keying Material Exporters for Transport Layer Security (TLS)," Mar. 2010, 7 pages, Internet Engineering Task Force (IETF), RFC 5705, The IETF Trust and the persons identified as the document authors.

M. Tuexen et al., "Datagram Transport Layer Security (DTLS) for Stream Control Transmission Protocol (SCTP)," Jan. 2011, 9 pages, Internet Engineering Task Force (IETF), RFC 6083, The IETF Trust and the persons identified as the document authors.

E. Rescorla et al., "Datagram Transport Layer Security Version 1.2," Jan. 2012, 32 pages, Internet Engineering Task Force (IETF), RFC 6347, The IETF Trust and the persons identified as the document authors.

R. Stewart et al., "Sockets API Extensions for the Stream Control Transmission Protocol (SCTP)," Dec. 2011, 115 pages, Internet Engineering Task Force (IETF), RFC 6458, The IETF Trust and the persons identified as the document authors.

A. Cooper et al., "Privacy Considerations for Internet Protocols," Jul. 2013, 36 pages, Internet Architecture Board (IAB), RFC 6973, The IETF Trust and the persons identified as the document authors.

S. Farrell et al., "Pervasive Monitoring Is an Attack," May 2014, 6 pages, Internet Engineering Task Force (IETF), RFC 7258, The IETF Trust and the persons identified as the document authors.

M. Belshe et al., "Hypertext Transfer Protocol Version 2 (HTTP/2)," May 2015, 96 pages, Internet Engineering Task Force (IETF), RFC 7540, The IETF Trust and the persons identified as the document authors.

B. Leiba, "Ambiguity of Uppercase vs Lowercase in RFC 2119 Key Words," May 2017, 4 pages, Internet Engineering Task Force (IETF), RFC 8174, IETF Trust and the persons identified as the document authors.

R. Stewart et al., "Stream Schedulers and User Message Interleaving for the Stream Control Transmission Protocol," Nov. 2017, 23 pages, Internet Engineering Task Force (IETF), RFC 8260, IETF Trust and the persons identified as the document authors.

E. Rescorla, "The Transport Layer Security (TLS) Protocol Version 1.3," Aug. 2018, 160 pages, Internet Engineering Task Force (IETF), RFC 8446, IETF Trust and the persons identified as the document authors.

J. Salowey et al., "IANA Registry Updates for TLS and DTLS," Aug. 2018, 20 pages, Internet Engineering Task Force (IETF), RFC 8447, IETF Trust and the persons identified as the document authors.

3GPP TS 33.501 V16.5.0, "3rd Generation Partnership Project; Technical Specification Group Services and System Aspects; Security architecture and procedures for 5G system (Release 16)," Dec. 2020, 253 pages, 3GPP Organizational Partners.

3GPP TS 38.413 V16.3.0, "3rd Generation Partnership Project; Technical Specification Group Radio Access Network; NG-RAN; NG Application Protocol (NGAP) (Release 16)," Sep. 2020, 466 pages, 3GPP Organizational Partners.

3GPP TS 38.423 V16.3.0, "3rd Generation Partnership Project; Technical Specification Group Radio Access Network; NG-RAN; Xn application protocol (XnAP) (Release 16)," Sep. 2020, 451 pages, 3GPP Organizational Partners.

3GPP TS 38.463 V16.3.0, "3rd Generation Partnership Project; Technical Specification Group Radio Access Network; NG-RAN; E1 Application Protocol (E1AP) (Release 16)," Sep. 2020, 235 pages, 3GPP Organizational Partners.

3GPP TS 38.473 V16.3.1, "3rd Generation Partnership Project; Technical Specification Group Radio Access Network; NG-RAN; F1 application protocol (F1AP) (Release 16)," Oct. 2020, 455 pages, 3GPP Organizational Partners.

E. Rescorla et al., "The Datagram Transport Layer Security (DTLS) Protocol Version 1.3 draft-ietf-tls-dtls13-39," Nov. 2, 2020, 58 pages, IETF Trust and the persons identified as the document authors.

M. Westerlund et al., "Datagram Transport Layer Security (DTLS) over Stream Control Transmission Protocol (SCTP) draft-westerlund-tsvwg-dtls-over-sctp-bis-01," Feb. 22, 2021, 22 pages, TSVWG, Internet-Draft, IETF Trust and the persons identified as the document authors.

(56) References Cited

OTHER PUBLICATIONS

"Recommendations for securing networks with IPsec," Aug. 3, 2015, 17 pages, Technical Report, DAT-NT-003-EN/ANSSI/SDE/NP, Paris, France.

* cited by examiner

DTLS/SCTP ENHANCEMENTS FOR RAN SIGNALING PURPOSES

CROSS-REFERENCE TO RELATED APPLICATIONS

This application claims the benefit of U.S. Provisional Application No. 63/129,514, filed Dec. 22, 2020, which is hereby incorporated by reference.

TECHNICAL FIELD

Embodiments of the disclosure relate to the field of signaling; and more specifically, to Datagram Transport Layer Security (DTLS)/Stream Control Transmission Protocol (SCTP) enhancements for Radio Access Network (RAN) signaling purpose.

BACKGROUND ART

Fifth Generation (5G) RAN uses signaling protocols, such as NG-C, Xn, E1 and F1, for transporting sensible data that can be exploited for obtaining information on the mobile equipment, their location and other features. Signaling data is defined with Abstract Syntax Notation One (ASN.1) and transported over Stream Control Transmission Protocol (SCTP) protocol among nodes. 3GPP recommends protecting the data for security and confidentiality with Internet Protocol Security (IPSec). Size of the signals has arbitrary length; e.g., a case with signals up to 144 k bytes. Since IPSec gateways and node connections are not protected and because IPsec is not mandatory, 3GPP also recommends adopting Datagram Transport Layer Security (DTLS)/SCTP for end-to-end protection. DTLS/SCTP protection according to 3GPP is mandatory for the node implementor and optional for the operator to activate. In order to exploit DTLS/SCTP, involved peers are to be both compliant to Request For Comments 6083 (RFC6083) and other related matters, and have properly deployed secrets, such as certificates.

Current RFC 6083 addresses one technique of using DTLS/SCTP. The current implementations of DTLS/SCTP lacks fragmentation into several DTLS records, in which the maximum accepted payload is 16,384 bytes. Thus, a single 16,384 byte DTLS encoded message is sent using SCTP. With the deployment of 5G/New Radio (NR) radio access technology, a more robust technique would provide enhanced performance and security.

SUMMARY

Certain aspects of the present disclosure and their embodiments may provide solutions to challenges noted above. The disclosure is related to an enhancement to DTLS/SCTP signaling and messaging. The disclosure provides a reference to the latest encryption algorithm, introduces a fragmentation and reassembly mechanism that makes it possible for transporting signals of arbitrary size. In some embodiments, the fragmentation allows message size of up to $2^{64}-1$ bytes. The disclosure provides a clear set of methods, procedures, and apparatus for identifying associations and further provides a backwards compatibility with legacy of RFC6083.

In one aspect of the disclosed system, a method at a first node provides for encoding a message for secure transmission to a second node. The method provides for receiving the message for transmission to the second node and fragmenting the message into a plurality of fragments, wherein each fragment is of a selected size. The method further provides for encoding separately each fragment of the plurality of fragments using DTLS, combining DTLS encoded fragments into a SCTP message, and transmitting the message as a plurality of DTLS encoded fragments in the SCTP message to the second node.

In a second aspect of the disclosed system, a first node encodes a message for secure transmission to a second node. The first node, having a processor and a memory with instructions, receives the message for transmission to the second node and fragments the message into a plurality of fragments, wherein each fragment is of a selected size. The first node encodes separately each fragment of the plurality of fragments using DTLS, combines DTLS encoded fragments into a SCTP message, and transmits the message as a plurality of DTLS encoded fragments in the SCTP message to the second node.

In a third aspect of the disclosed system, a method at a second node provides for decoding a secure message received from a first node. The method provides for receiving a SCTP message from the first node and determining that the SCTP message has a plurality of DTLS encoded fragments. The method further provides for defragmenting the SCTP message into a plurality of fragments, wherein each fragment is of a selected size and separately encoded using DTLS, decoding separately each fragment of the plurality of fragments, and combining decoded fragments to retrieve the secure message.

In a fourth aspect of the disclosed system, a second node decodes a secure message received from a first node. The second node, having a processor and a memory with instructions, receives a SCTP message from the first node and determines that the SCTP message has a plurality of DTLS encoded fragments. The second node defragments the SCTP message into a plurality of fragments, wherein each fragment is of a selected size and separately encoded using DTLS, decodes separately each fragment of the plurality of fragments, and combines decoded fragments to retrieve the secure message.

BRIEF DESCRIPTION OF THE DRAWINGS

The disclosure may best be understood by referring to the following description and accompanying drawings that are used to illustrate embodiments of the disclosure. In the drawings.

SCTP for transmission of a message, according to some embodiments of the present disclosure.

Figure 8:
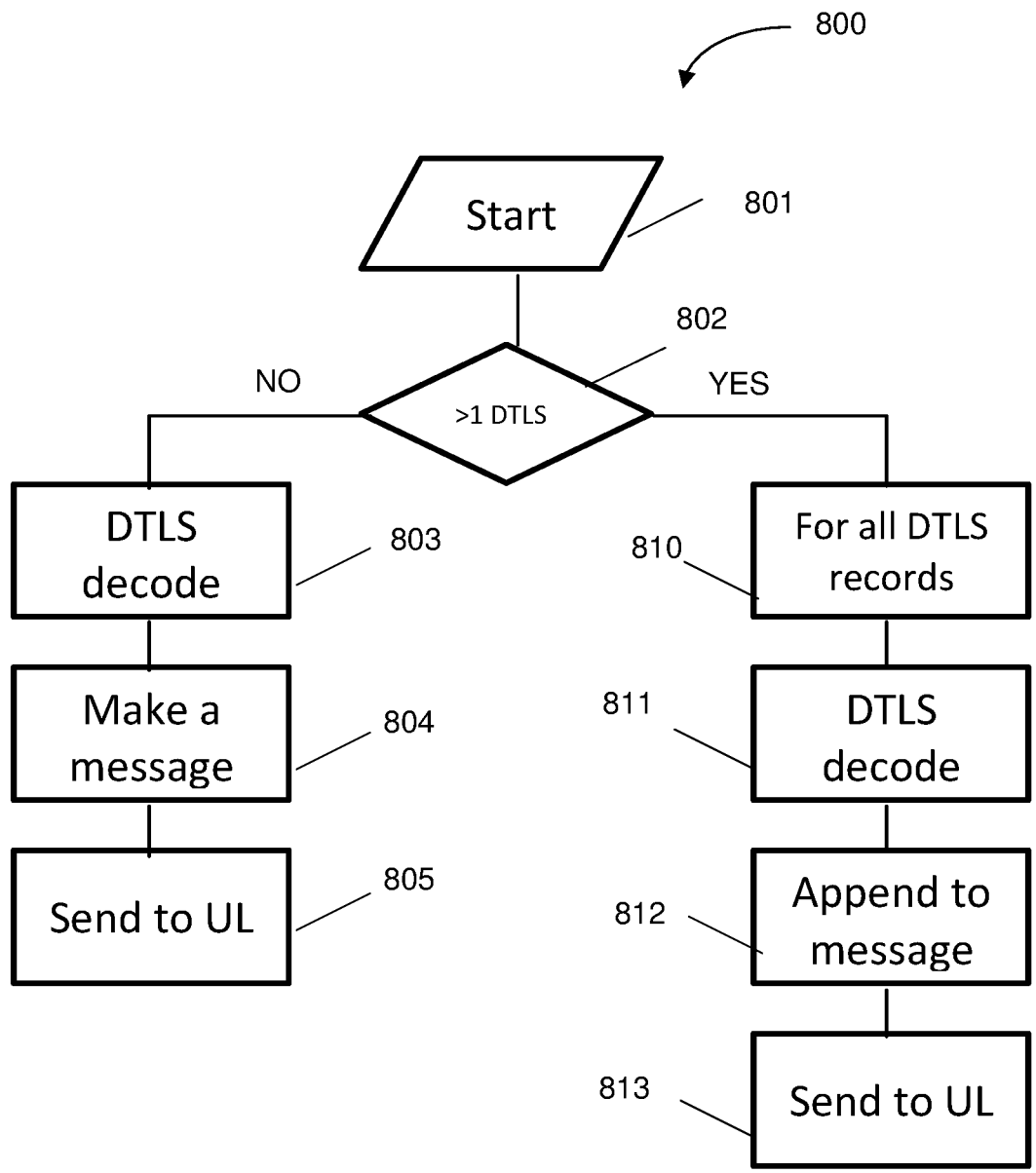

FIG. 8 illustrates a flow diagram at the second node to implement a legacy DTLS/SCTP or the enhanced DTLS/SCTP in recovering a sent message, according to some embodiments of the present disclosure.

Figure 9:
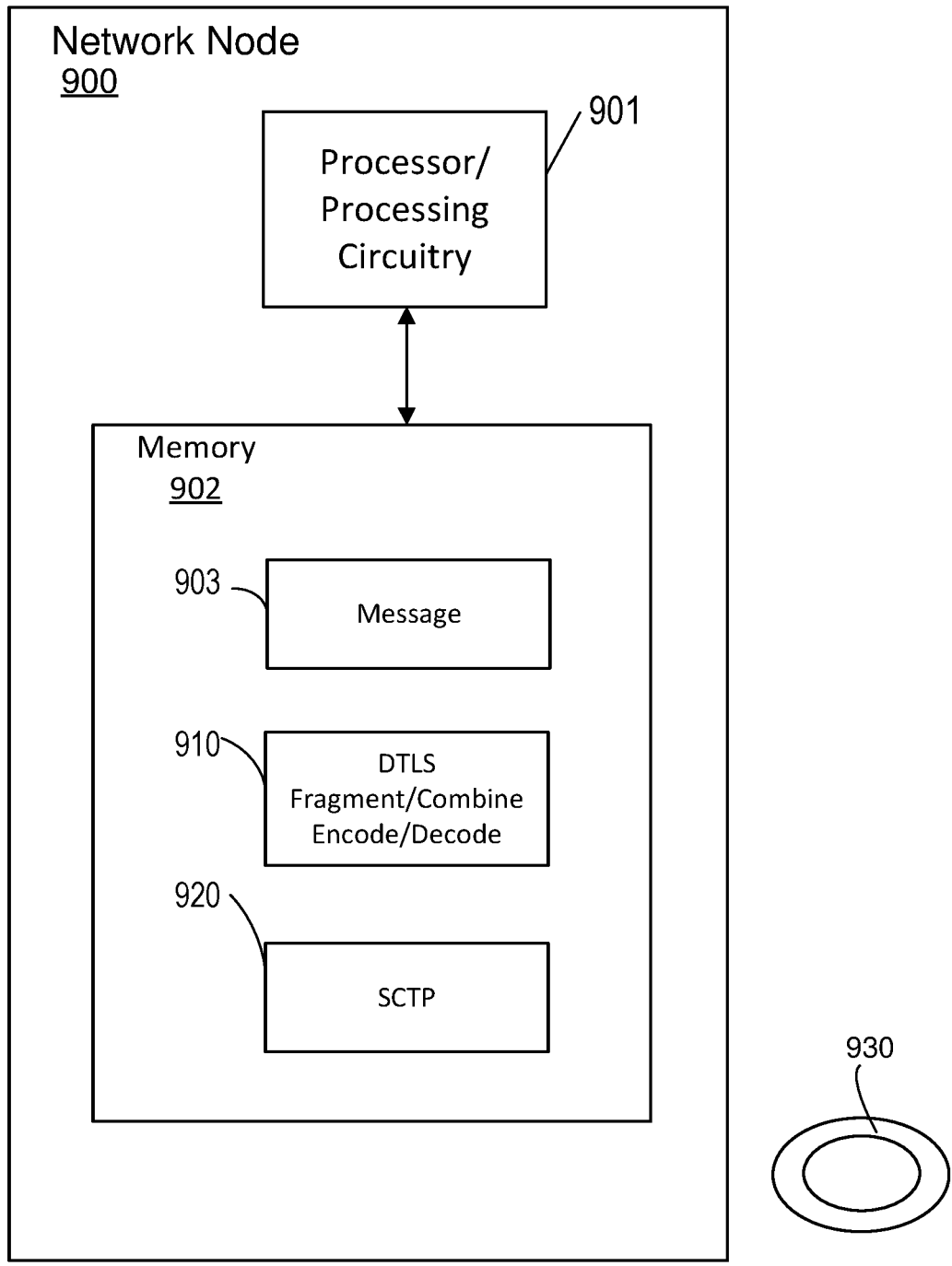

FIG. 9 illustrates implementation of a network node, according to some embodiments of the present disclosure.

Figure 10:
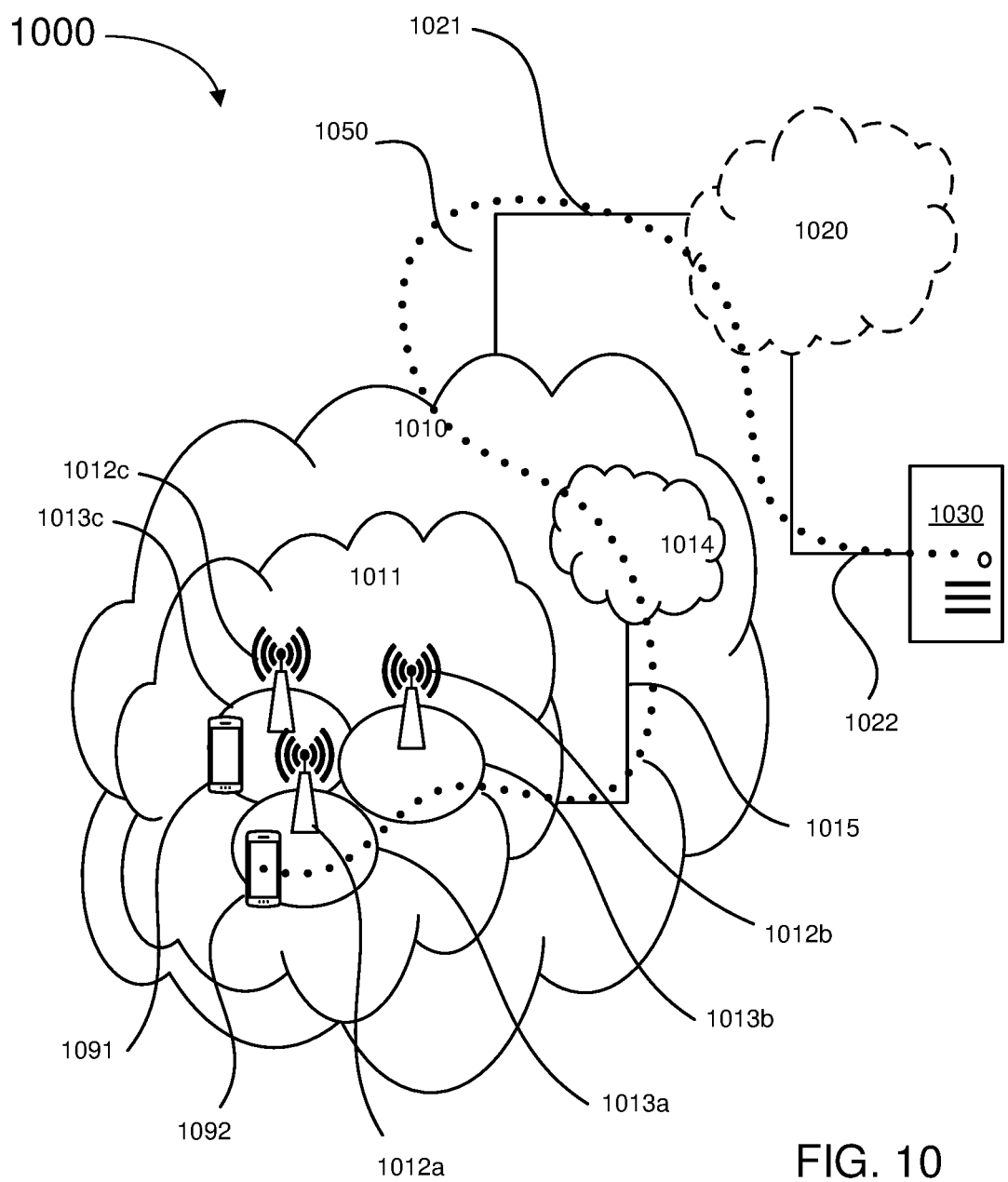

FIG. 10 illustrates a communication system, according to some embodiments of the present disclosure.

DETAILED DESCRIPTION

The following description describes methods and apparatus for DTLS/SCTP enhancement for RAN signaling purpose. The following description describes specific details such as operative steps, fragmentation schemes, node implementations, network signaling, and type of radio access technology, to provide a more thorough understanding of the present disclosure. It will be appreciated, however, by one skilled in the art that the embodiments of the present disclosure can be practiced without such specific details. In other instances, control structures, circuits, memory structures, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, model, or characteristic is described in connection with an embodiment, it is submitted that it is within the knowledge of one skilled in the art to implement such feature, structure, characteristic, or model in connection with other embodiments whether or not explicitly described.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry (or processor) may be configured to execute program code stored in memory, which may include one or several types of memory, such as read-only memory (ROM), random-access memory (RAM), cache memory, flash memory devices, optical storage devices, etc. Program code stored in memory includes program instructions for executing one or more communications protocols as well as instructions for carrying out one or more of the techniques described herein. In some implementations, the processing circuitry may be used to cause the respective functional unit to perform corresponding functions according one or more embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

While the flow diagrams in the figures show a particular order of operations performed by certain embodiments, it should be understood that such order is exemplary (e.g., alternative embodiments may perform the operations in a different order, combine certain operations, overlap certain operations, etc.).

Some of the embodiments contemplated herein apply to communication technologies applicable to the $3^{rd}$ Generation Partnership Project (3GPP), including 5G/NR. Some embodiments can apply to other older radio technology, as well as to new radio technologies being contemplated going forward. The disclosure describes the signaling and messaging between two nodes within a network. The two nodes can be any two nodes that employ signaling to communicate with each other and/or to transfer messages and/or data. The two nodes can communicate by wired and/or wireless connection.

While the disclosure is described in terms of several embodiments, those skilled in the art will recognize that the disclosure is not limited to the embodiments described and can be practiced with modification and alteration within the spirit and scope of the appended claims. Thus, the description is to be regarded as illustrative instead of limiting.

Core essence of the solution is providing a consistent set of methods for creating and maintaining a confidential end-to-end association by exploiting DTLS and SCTP. Some features are the strict relationship between DTLS and SCTP as the association lifetime is tied to both functionalities, the strict avoidance of non-protected data transfer among peers, the evolution from previous techniques, and, offering to SCTP user protocols, such as the ones defined by 3GPP, which allow the possibility to transfer messages with large size, or even no size limit.

In more detail, the disclosure ties the existence of SCTP to DTLS, so that when two peers (e.g., nodes) have agreed to create a DTLS/SCTP association by adopting the described options in the INIT/INIT-ACK handshake, only authenticated and DTLS encrypted messages can be sent. Violations in either DTLS or SCTP protocols that compromise data integrity can result in association closure. A size of a message has no limits, or at least large limits, and user options, such as sequentiality or asynchronous sending (e.g., stream number) are kept.

There are, proposed herein, various embodiments which address one or more of the issues disclosed herein. The proposed solution provides a method for transferring data with the confidentiality provided by DTLS for 3GPP signaling protocols, such as NG-C, Xn. F1 and E1 that exploit SCTP as transport protocol. The adoption of the proposed solution would require no changes and poses limited or no limitation to the above stated protocols, providing a confidential end-to-end transfer.

In implementing some embodiments, this disclosure proposes a number of changes or enhancements to RFC 6083 that have various different motivations, such as supporting large messages. Currently, RFC 6083 allows only messages that could fit within a single DTLS record (e.g., 16,384 bytes). 3GPP has run into this limitation where there are at least four SCTP using protocols (F1, E1, Xn, NG-C) that can potentially generate messages over the size of 16,384 bytes.

As an example of a need for an enhancement, almost 10 years have passed since RFC 6083 was written, and significant evolution has happened in the area of DTLS and security algorithms Thus, DTLS 1.3 is the newest version of DTLS and the SHA-1 Hash-based Message Authentication Code (HMAC) algorithm of RFC 4895 is getting towards the end of usefulness. Thus, this disclosure recommends usage of relevant versions and algorithms that are more up to date in implementing the enhancements. The disclosure introduces an encapsulation of the DTLS encoding/decoding program in order to hide the complexity of the segmentation/reassembly mechanism both towards the Upper Layer Protocol and to the DTLS program.

Figure 1:
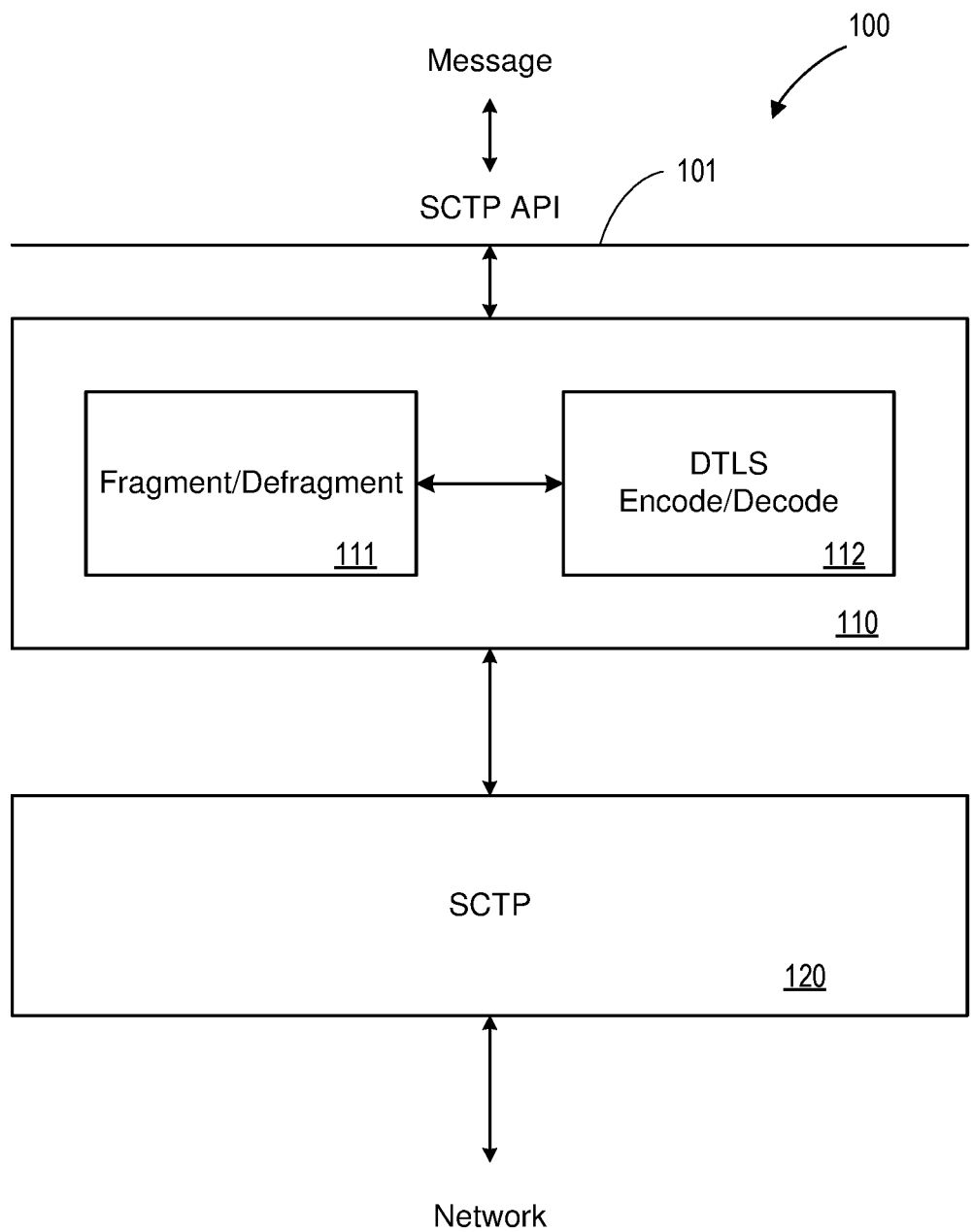
FIG. 1 illustrates a system diagram to provide the enhanced DTLS/SCTP signaling and messaging, according to some embodiments of the present disclosure.

FIG. 1 illustrates a system diagram to provide the enhanced DTLS/SCTP signaling and messaging, according to some embodiments of the present disclosure. FIG. 1 shows a node 100 that implements a traffic flow, where a SCTP Application Programming Interface (API) 101 is the interface between a SCTP functional block (or module) 120 and an Upper Layer Protocol where a message is received or recovered. Interposed between the SCTP API 101 and SCTP functional block 120 is a DTLS functional block (or module) 110. In some embodiments, the SCTP API 101 and the SCTP functional block 120 are kept identical to the interface defined in RFC4960 for compatibility. DTLS 110 is the function block implementing the DTLS protocol. SCTP 120 is the function block implementing SCTP protocol according to RFC4960 and the various extensions.

The DTLS functional block 110 provides the enhancements for RAN signaling. The DTLS functional block 110 includes a fragment/defragment module 111 and DTLS encode/decode module 112. In terms of which is used, module 111 fragments an outgoing message (egress) at the SCTP API 101 and the fragmented portions are DTLS encoded by module 112 for transmission onto the network via SCTP block 120. For incoming SCTP message (ingress) from the network to the SCTP block 120, the module 111 defragments the incoming SCTP message and the module 112 DTLS decodes each defragmented portion. The decoded fragments are then assembled as an incoming message and passed on to SCTP API 101. Subsequent figures provide a more detailed description of the various blocks of node 100, both in the egress and ingress directions.

As noted in the background section above, current RFC 6083 addresses one technique of using DTLS/SCTP, in which a single maximum size 16,384-byte DTLS encoded message is sent per SCTP message. Thus, the legacy implementation permits only one 16,384-byte message for association with an SCTP message. When the message size is larger than 16,384 bytes, the legacy implementation does not allow transmission using DTLS over SCTP. With the deployment of 5G/NR access technology, a more robust technique needs to send more than 16,384 bytes using DTLS over SCTP for enhanced performance and security.

Figure 2:
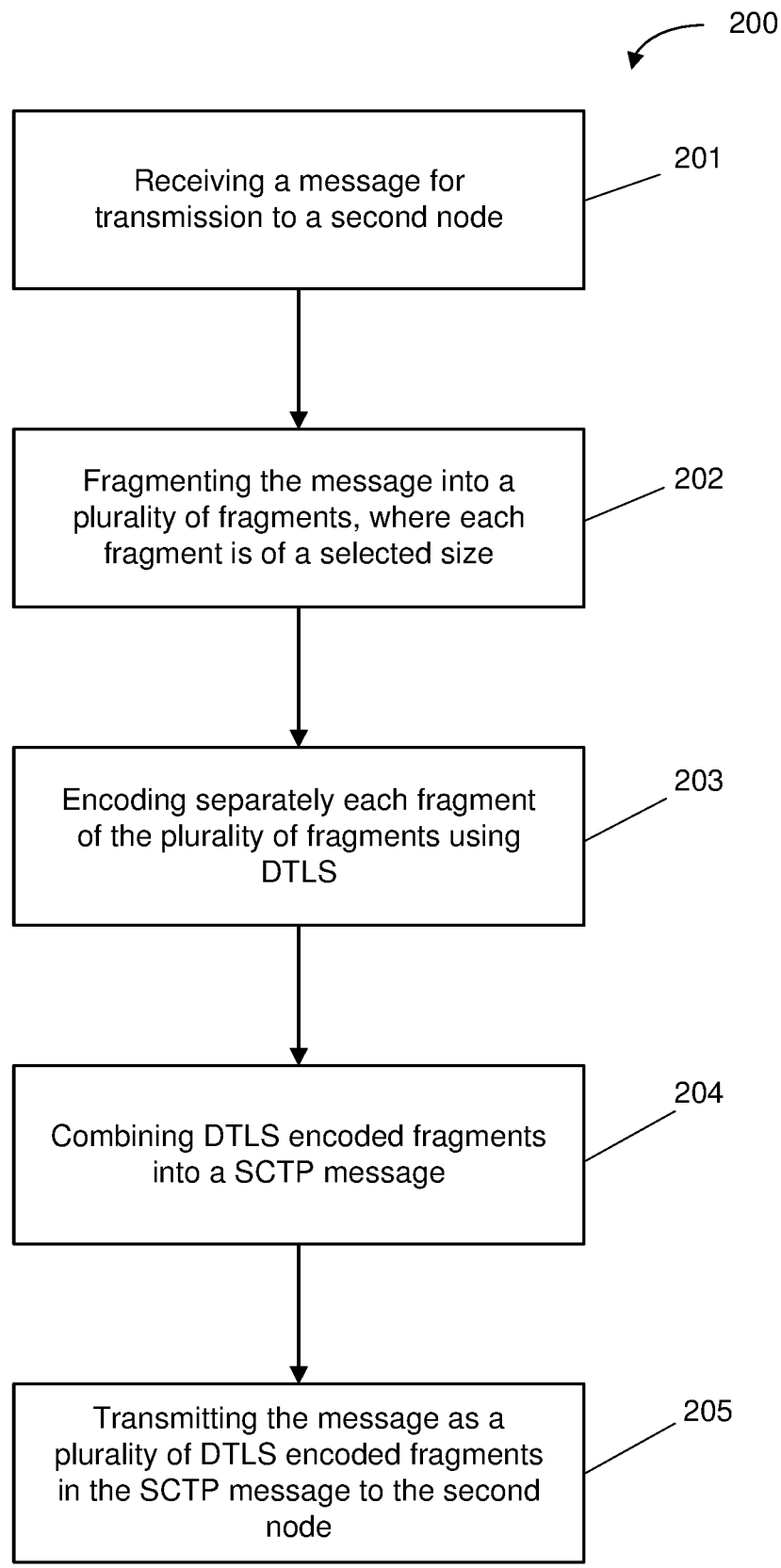
FIG. 2 illustrates a flow diagram for a method of operation at a first node, according to some embodiments of the present disclosure.
Figure 3:
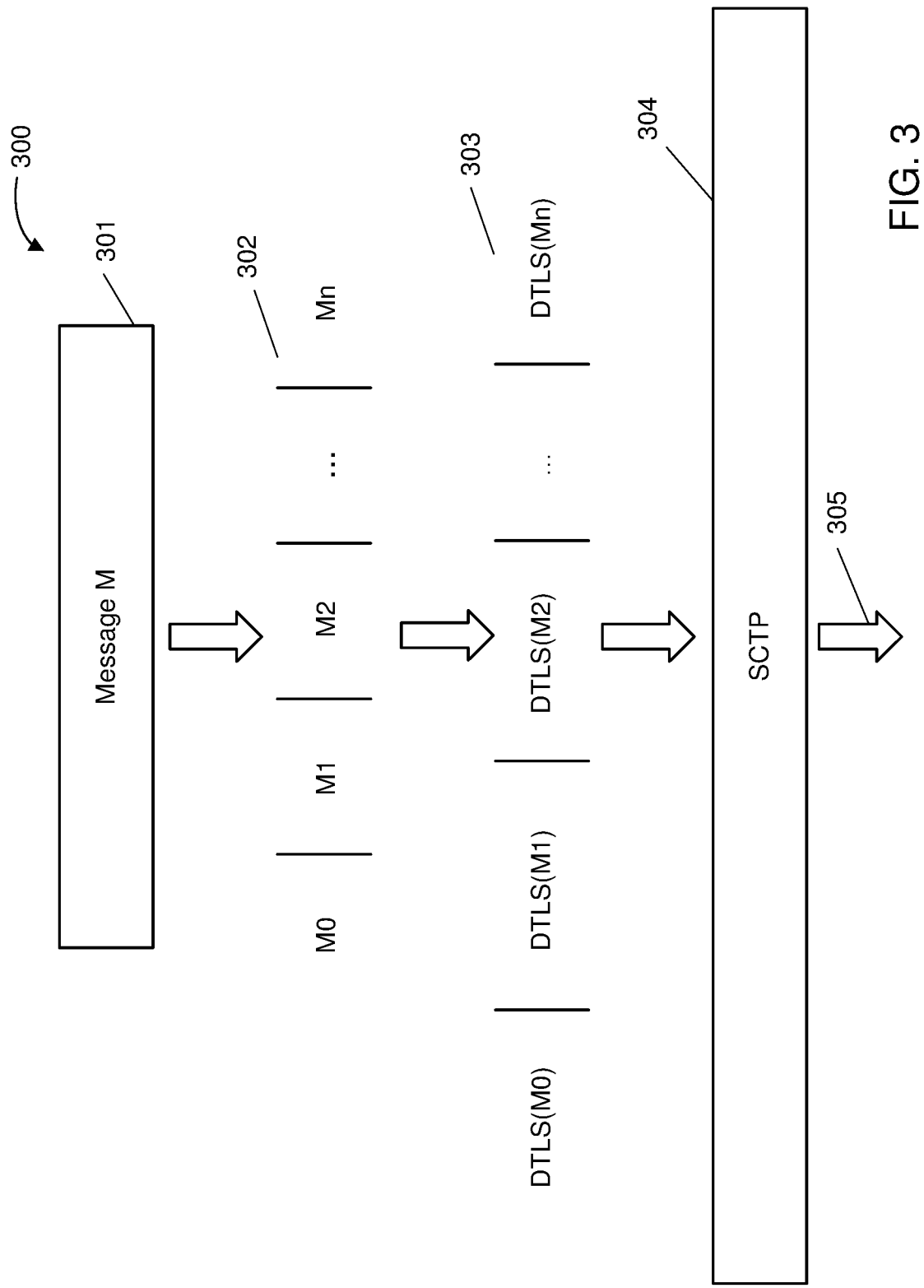
FIG. 3 illustrates a fragmentation and DTLS encoding at the first node, according to some embodiments of the present disclosure.

FIG. 2 illustrates a flow diagram for a method of operation 200 at a first node, according to some embodiments of the present disclosure. FIG. 2 is better understood when viewed in context of the functional diagram of FIG. 1. FIG. 3 illustrates a fragmentation and DTLS encoding at the first node, according to some embodiments of the present disclosure. FIG. 3 shows a diagram 300 that illustrates the method 200 when node 100 operates in the egress direction.

At operation 201, the node 100 (treated as a first node) receives a message 301 for transmission to a second node via the network. When the message length is more than a selected size, such as 16,384 bytes, the method 200 allows multiple 16,384 byte portions, or some other selected size, to be sent in one SCTP transmission.

At operation 202, module 111 of the DTLS functional block 110 fragments the message into multiple fragments, where each fragment is of a selected size, such as 16,384 bytes. In some embodiments, the fragments need not be of the same size, so that the selected size may vary among the fragments, provided the maximum supported size does not exceed the 16,384 bytes, in order to retain compatibility with the existing DTLS record format. FIG. 3 shows the fragmentation of Message M 301 into fragments M0, M1, M2 . . . Mn 302.

At operation 203, module 112 of the DTLS functional block 110 encodes each fragment separately using DTLS. As each DTLS encoded message may contain a length field describing the length of the encoded message, in those cases the fragments of a message is not required to be of the same size, as long as they are no more than the maximum supported size of 16,384 bytes. FIG. 3 shows separate DTLS encoding of the fragments DTLS(M0), DTLS(M1), DTLS(M2) . . . DTLS(Mn) 303. Note that, because the method limits each fragment to a selected size (e.g., 16,384 bytes) and each fragment is separately DTLS encoded, the DTLS limit requirement is not violated.

At operation 204, the DTLS encoded fragments are combined into a single SCTP message 304. At operation 205, the node transmits 305 the message as multiple DTLS encoded fragments in one SCTP message to the second node. As noted above, SCTP is not limiting in size as compared to DTLS, so that multiple DTLS encoded segments can be combined and sent using SCTP. In the transmission of the SCTP message, the SCTP message may be sent in multiple "chunks". However, the SCTP message is still one message, whether sent in one chunk or multiple chunks.

In some embodiments, the SCTP implementation supports fragmentation of messages using DATA (RFC4960), and optionally I-DATA (RFC8260) chunks. DTLS/SCTP works as a shim layer between the message API 101 and SCTP 120. The fragmentation works similar as the DTLS fragmentation of handshake messages. On the sender side, a message fragments (M0, M1, M2 . . . ) into multiple fragments, where each fragment is equal to or less than 16,384 bytes. The resulting fragments are each protected with DTLS and the resulting DTLS records are combined. In some embodiments, the DTLS encoded fragments DTLS(M0), DTLS(M1), DTLS(M2) . . . are assembled by appending the DTLS encoded fragments to each other (e.g., concatenated). The DTLS connection is coupled to the SCTP association. The SCTP-AUTH key is derived from the DTLS connection and the SCTP association is configured to use DTLS as described. The SCTP with SCTP-AUTH is required to prevent replay attacks on the application.

The DTLS connection can be established at the beginning of the SCTP association and be terminated when the SCTP association is terminated. A DTLS connection does not span multiple SCTP associations.

As it is required to establish the DTLS connection at the beginning of the SCTP association, either of the peers should not send any SCTP messages that are not protected by DTLS. So the case that an endpoint receives data that is not either DTLS messages on Stream 0 or protected messages in the form of a sequence of DTLS Records on any stream can be a protocol violation. The receiver may terminate the SCTP association due to this protocol violation.

Application protocols using DTLS over SCTP can register and use a separate payload protocol identifier (PPID) and need not reuse the PPID that they registered for running directly over SCTP. Using the same PPID does no harm as long as the application can determine whether or not DTLS is used. However, for protocol analyzers, for example, it is much easier if a separate PPID is used. This means, in particular, that there is no specific PPID for DTLS.

In some embodiments, all DTLS Handshake, Alert, or ChangeCipherSpec (DTLS 1.2 only) messages is transported on stream 0 with unlimited reliability and with the ordered delivery feature. DTLS messages of the record protocol, which carries the protected messages, can use multiple streams other than stream 0. They may use stream 0 as long as the ordered message semantics is acceptable. On stream 0, protected messages as well as any DTLS message that isn't record protocol will be mixed, thus the head of line blocking can occur.

Data chunks of SCTP are sent in an authenticated way as described in RFC4895. All other chunks that can be authenticated, i.e., all chunk types that can be listed in the Chunk List Parameter (RFC4895) are also sent in an authenticated way. This makes sure that an attacker cannot modify the stream in which a message is sent or affect the ordered/unordered delivery of the message.

If PR-SCTP as defined in RFC3758 is used, FORWARD-TSN chunks is also sent in an authenticated way as described in RFC4895. This makes sure that it is not possible for an attacker to drop messages and use forged FORWARD-TSN, SACK, and/or SHUTDOWN chunks to hide this dropping.

I-DATA chunk type as defined in RFC8260 is recommended to be supported to avoid some of the down sides that large messages have on blocking transmission of later arriving high priority messages. However, the support is not mandated and negotiated independently from DTLS/SCTP. If I-DATA chunks are used then they can be sent in an authenticated way as described in RFC4895.

When using the enhanced DTLS/SCTP, the Secure Hash Algorithm-256 (SHA-256) Message Digest Algorithm can be supported in the SCTP-AUTH (RFC4895) implementation. SHA-1 should not be used when using enhanced DTLS/SCTP. RFC4895 requires support and inclusion of SHA-1 in the HMAC-ALGO parameter, thus, to meet both requirements the HMAC-ALGO parameter can include both SHA-256 and SHA-1 with SHA-256 listed prior to SHA-1 to indicate the preference.

SCTP-AUTH (RFC4895) is keyed using Endpoint-Pair Shared Secrets. In SCTP associations where DTLS is used, DTLS is used to establish these secrets. The endpoints should not use another mechanism for establishing shared secrets for SCTP-AUTH.

The endpoint-pair shared secret for Shared Key Identifier 0 is empty and should be used when establishing a DTLS connection. Whenever the master key changes, a 64-byte shared secret is derived from every master secret and provided as a new endpoint-pair shared secret by using the TLS-Exporter.

For DTLS 1.3, the exporter is described in RFC8446. For DTLS 1.2, the exporter is described in RFC5705. The exporter can use a label and with no context. The new Shared Key Identifier can be the old Shared Key Identifier incremented by 1. If the old one is 65535, the new one can be 1. Before sending the DTLS Finished message, the active SCTP-AUTH key can be switched to the new one. Once the corresponding Finished message from the peer has been received, the old SCTP-AUTH key can be removed.

To prevent DTLS from discarding DTLS messages while it is shutting down, a CloseNotify message can only be sent after all outstanding SCTP messages have been acknowledged by the SCTP peer and should not still be revoked by the SCTP peer. Prior to processing a received CloseNotify, all other received SCTP messages that are buffered in the SCTP layer can be read and processed by DTLS.

The adoption of DTLS over SCTP according to the disclosure is meant to add to SCTP the option for transferring encrypted data. When DTLS-option is enabled, all data being transferred can be protected by chunk authentication and DTLS encrypted. Chunks that can be transferred can be specified in the CHUNK list parameter according to RFC4895. Error handling for authenticated chunks is according to RFC4895.

Figure 4:
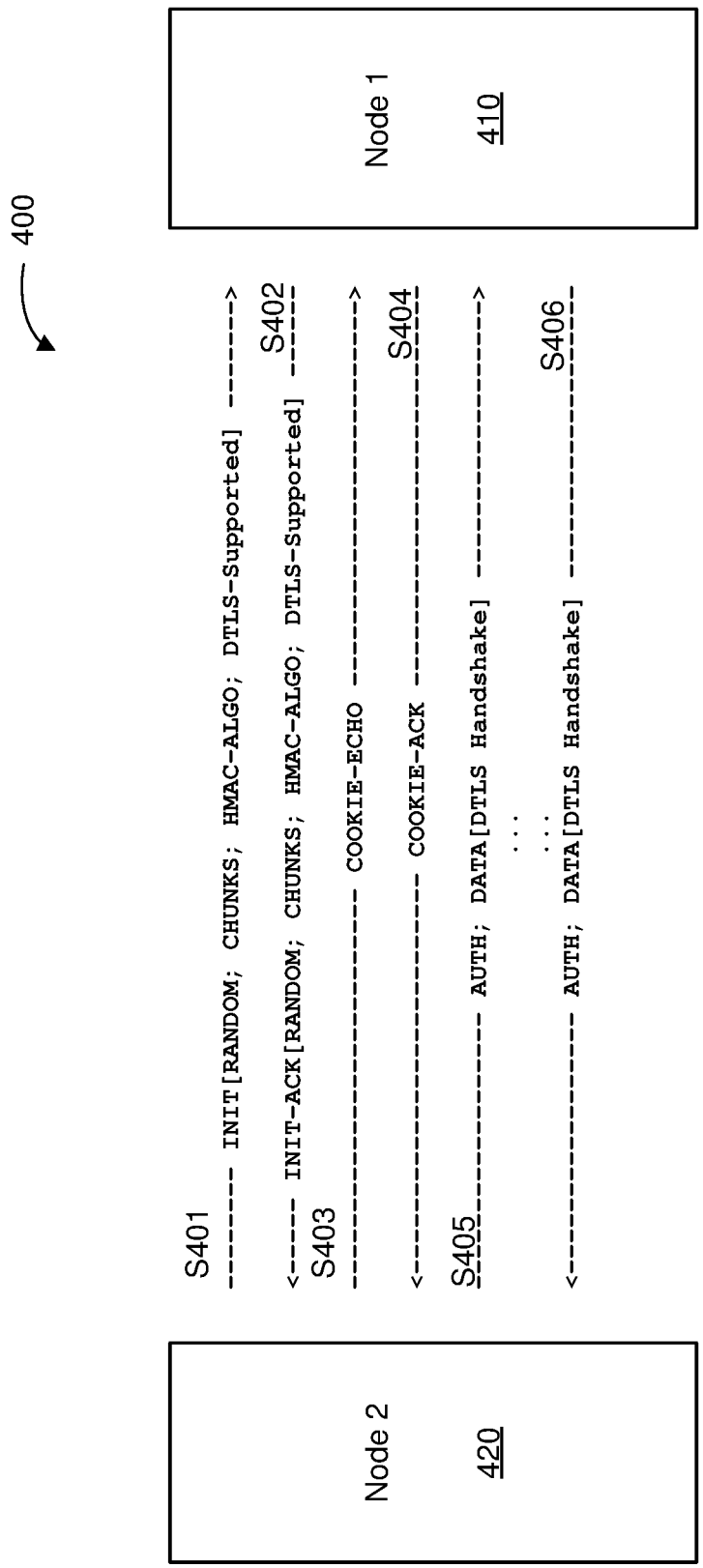
FIG. 4 illustrates a signaling diagram between a first node and a second node, according to some embodiments of the present disclosure.

FIG. 4 illustrates a signaling diagram 400 between a first node and a second node, according to some embodiments of the present disclosure. Diagram 400 illustrates the initialization between a first node (Node 1) 410 and a second node (Node 2) 420. Node 1 and node 2 may be any type of nodes that communicate with each other, such as nodes in a communication network.

Initialization of enhanced DTLS/SCTP may use the following options to be part of the INIT/INIT-ACK handshake to indicate that DTLS is to be used:
 RANDOM: defined in RFC4895.
 CHUNKS: list of permitted chunks, defined in RFC4895.
 HMAC-ALGO: defined in RFC4895.
 DTLS-Supported: indicates enhanced DTLS/SCTP association supported.

It is to be appreciated that other options or alternative techniques may be implemented. When the above options are present, the association starts with the node 420 initiating the signaling. The DTLS-Supported indication (or similar alternatives) in INIT S401 notifies the node 410 that node 420 supports the enhanced DTLS/SCTP. No data transfer is permitted before DTLS handshake is complete. Data chunks that are received before DTLS handshake can be silently discarded. Chunk bundling is permitted according to RFC4960. The DTLS handshake will enable authentication of both the peers and also have their supported message size.

When the SCTP client node 420 initiates the association S401, the DTLS-Supported indication signals to the node 410 that the client supports the enhanced DTLS/SCTP Option, and DTLS-Supported can also indicate a size of the message it can receive or, alternatively, a number of DTLS fragments it can receive. A variety of factors can limit the message size or number of fragments it can receive. For example, node 420 may have limited buffer size to receive the message or limited processing capability to handle incoming data. In response, the server node 410 sends an INIT-ACK S402, also containing the enhanced DTLS/SCTP Option, to indicate that the node 410 is capable of the enhancement and not relegated to the legacy usage of only a single DTLS segment. In some embodiments, the DTLS-Supported may only contain information related to the ability to implement the enhanced DTLS/SCTP. In that instance, the information pertaining to message/fragment size can be interchanged in a later handshake signal as described below. The DTLS-Supported signaling can contain other information as well for transfer between the two nodes.

The node 420 can receive an INIT-ACK S402 also containing the enhanced DTLS/SCTP Option to indicate that the node 410 is capable of the enhancement and not relegated to the legacy usage of only a single DTLS segment. The term "Option" refers to the instances in some embodiments where there is an option of using the legacy technique or the enhanced technique. In some embodiments, the enhanced technique can be made a mandatory requirement. If the node 410 replies with an INIT-ACK not containing the enhanced DTLS/SCTP Option, the node 420 can decide to keep on working with legacy RFC 6083 (e.g., single DTLS), plain data only, or to abort the association.

If the node 410 (e.g., the SCTP Server) supports the enhanced DTLS/SCTP, when receiving an INIT signaling S401 with the DTLS/SCTP Option, it can reply with an INIT-ACK signaling S402 also containing the enhanced DTLS/SCTP Option, to indicate that node 410 is capable of sending the enhanced DTLS/SCTP. The node 410 can follow the sequence for DTLS initialization and the related traffic case. After transfer of SCTP COOKIE-ECHO S403 and COOKIE-ACK S404 signaling, the node 420 sends DTLS Handshake S405 to begin the DTLS transfer. In response, the node 410 sends the message in enhanced DTLS/SCTP at S406, based on the size limitation indicated by the node 420.

As noted above, in some embodiments, the signaling of the message size or the number of fragments the node 420 can receive can be included with the DTLS-Supported indication at S401. However, in some embodiments, this information can be transmitted during the initiation of DTLS Handshake S405, instead of in DTLS-Supported. Furthermore, other embodiments may provide this information in other signaling.

Figure 5:
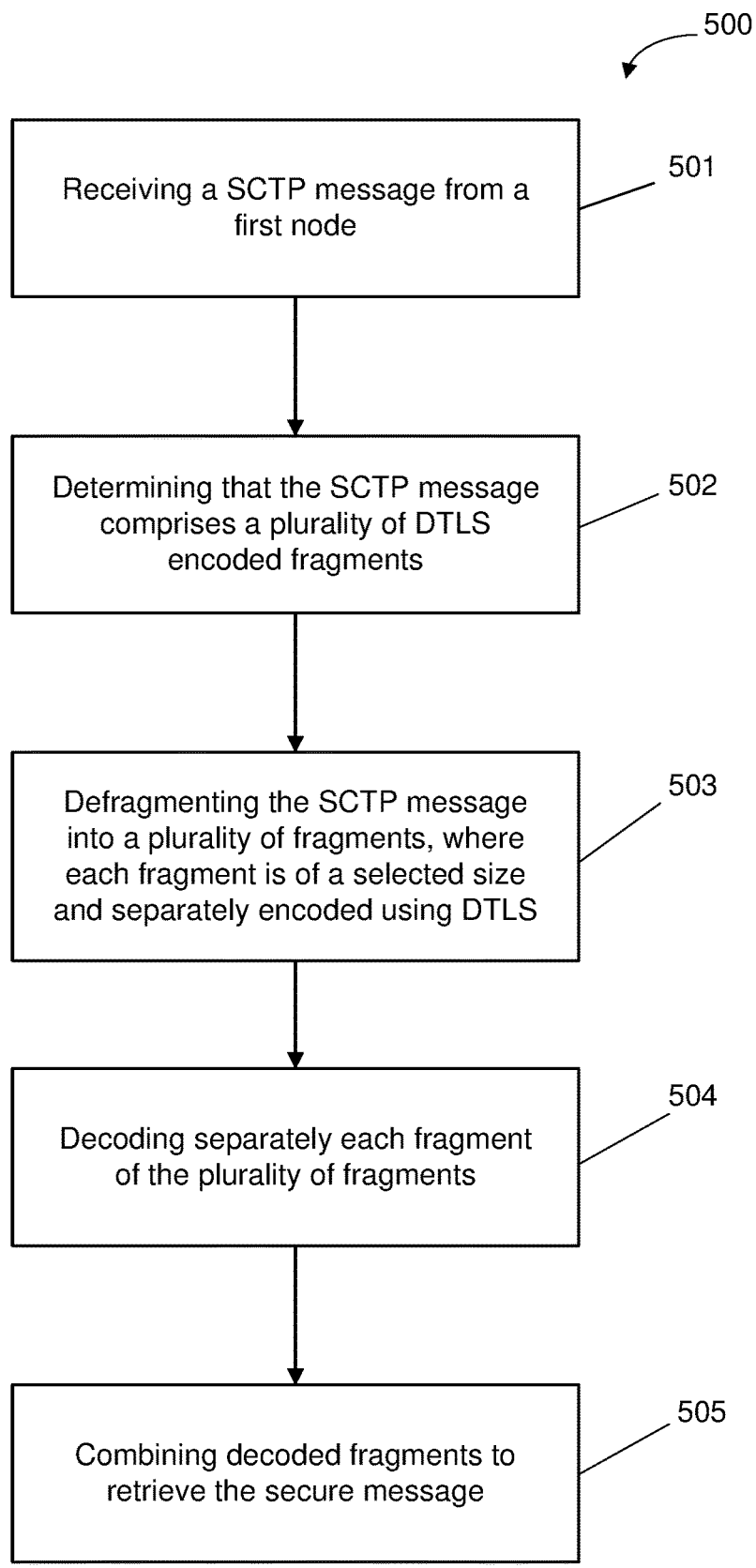
FIG. 5 illustrates a flow diagram for a method of operation at a second node, according to some embodiments of the present disclosure.

FIG. 5 illustrates a flow diagram for a method of operation at a second node, according to some embodiments of the present disclosure. Method 500 illustrates the ingress side, such as the node 420 of FIG. 4. The architecture of FIG. 1 is applicable as well for the ingress side. Accordingly, on the receiving side DTLS is used to decode (or decrypt) the incoming secure message. If a DTLS decryption fails, the node 420 can terminate the DTLS connection and the SCTP association. Due to SCTP-Auth preventing delivery of corrupt fragments of the protected message, this should only occur in case of implementation errors or internal hardware failures. If DTLS 1.3 is used, a length field (size/fragment information) can be omitted and a fixed sequence number can be used.

Figure 6:
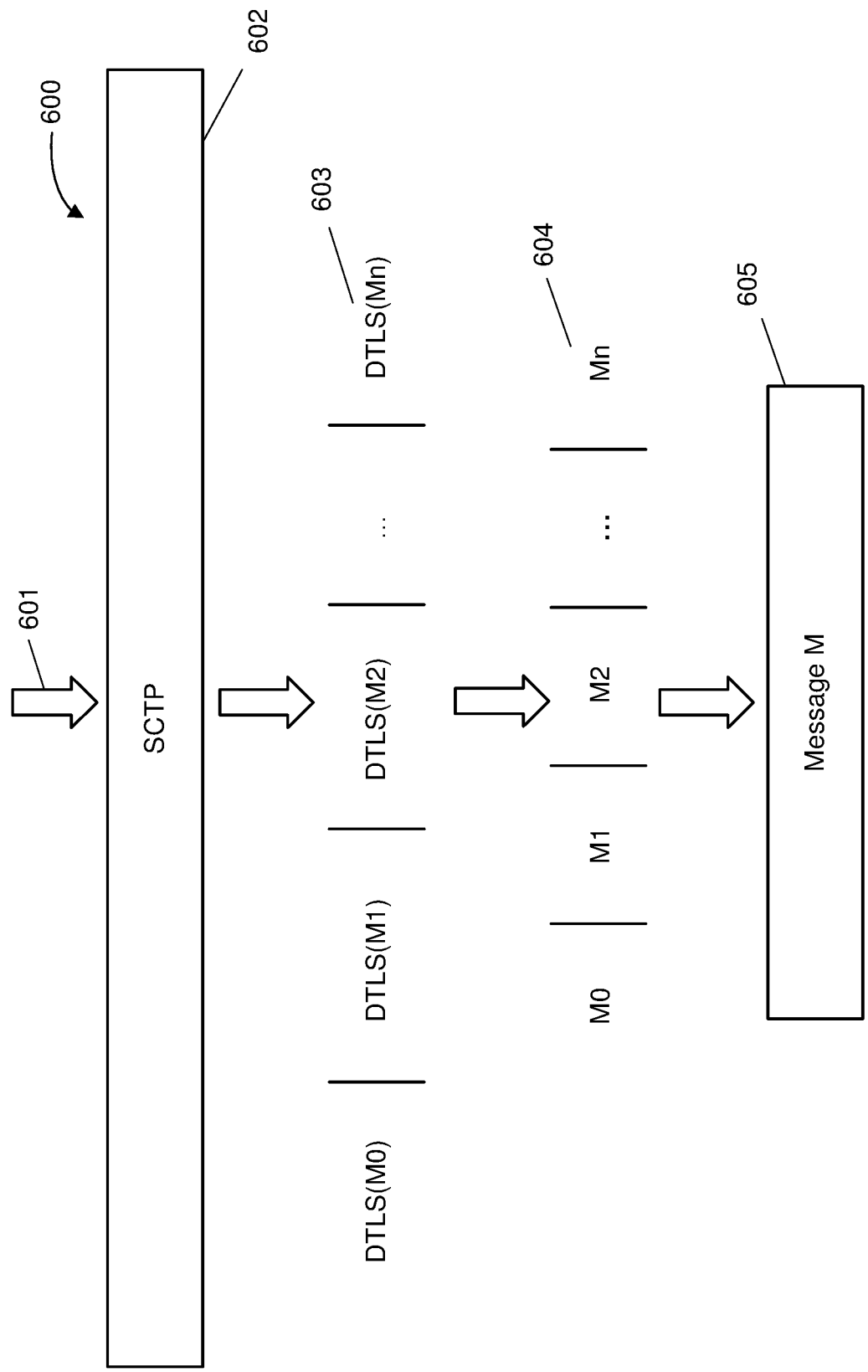
FIG. 6 illustrates a defragmentation and DTLS decoding at the second node, according to some embodiments of the present disclosure.

FIG. 5 illustrates the method of operation 500 at the second node, according to some embodiments of the present disclosure. FIG. 5 is better understood when viewed in context of the functional diagram of FIG. 1. FIG. 6 illustrates a defragmentation and DTLS decoding (or decrypting) at the second node (e.g., node 420), according to some embodiments of the present disclosure. FIG. 6 shows a diagram 600 that illustrates the method 500 when node 100 operates in the ingress direction.

At operation 501, the node 100 (operating as the second node) receives a secure SCTP message 501 transmitted from the first node via the network. When the message contains more than one DTLS fragment, the enhanced DTLS/SCTP Option allows the second node, at operation 502, to determine the multiple DTLS fragments sent in the one SCTP transmission.

At operation 503, module 111 of the DTLS functional block 110 defragments the secure incoming message into multiple DTLS fragments, where each fragment is of a selected size, such as 16,384 bytes. FIG. 6 shows the defragmentation of the SCTP message 602, received via network 601, into multiple DTLS fragments DTLS(M0), DTLS(M1), DTLS(M2) . . . DTLS(Mn) 603. Note that this defragmentation is the reverse process to the combining of the DTLS fragments at the first node, as described in the description above.

At operation 504, module 112 of the DTLS functional block 110 decodes each DTLS fragment separately using DTLS. FIG. 6 shows separate DTLS decoded (or decrypted) fragments 604, shown as M0, M1, M2 . . . Mn. Note that, because the transmission at the first node limits each fragment to a selected size (e.g., 16,384 bytes) and each fragment is separately DTLS encoded, the DTLS limit requirement is not violated at the receiving end. As noted above, the fragments may vary in size, however, the selected size does not exceed 16,384 bytes, in order to maintain compatibility with existing DTLS over SCTP.

At operation 505, the decoded fragments 604 are combined (e.g., appended, concatenated, etc.) into a single message 605. The message 605 is then sent uplink via SCTP API 101 as the recovered message M. The method 500 is essential the reverse process of method 200 to recover the secure DTLS/SCTP message sent from the first node.

The below section describes how an endpoint (either the first node or the second node) that supports the enhanced DTLS/SCTP can fallback to follow the older (e.g., legacy) DTLS/SCTP behavior described in RFC 6083. It is recommended to define a setting that represent the policy to allow fallback. However, the possibility to use fallback is based on using messages that are no longer than 16,384 bytes. In some embodiments fallback is not recommended to be enabled as it enables downgrade to weaker algorithms and versions of DTLS.

Figure 7:
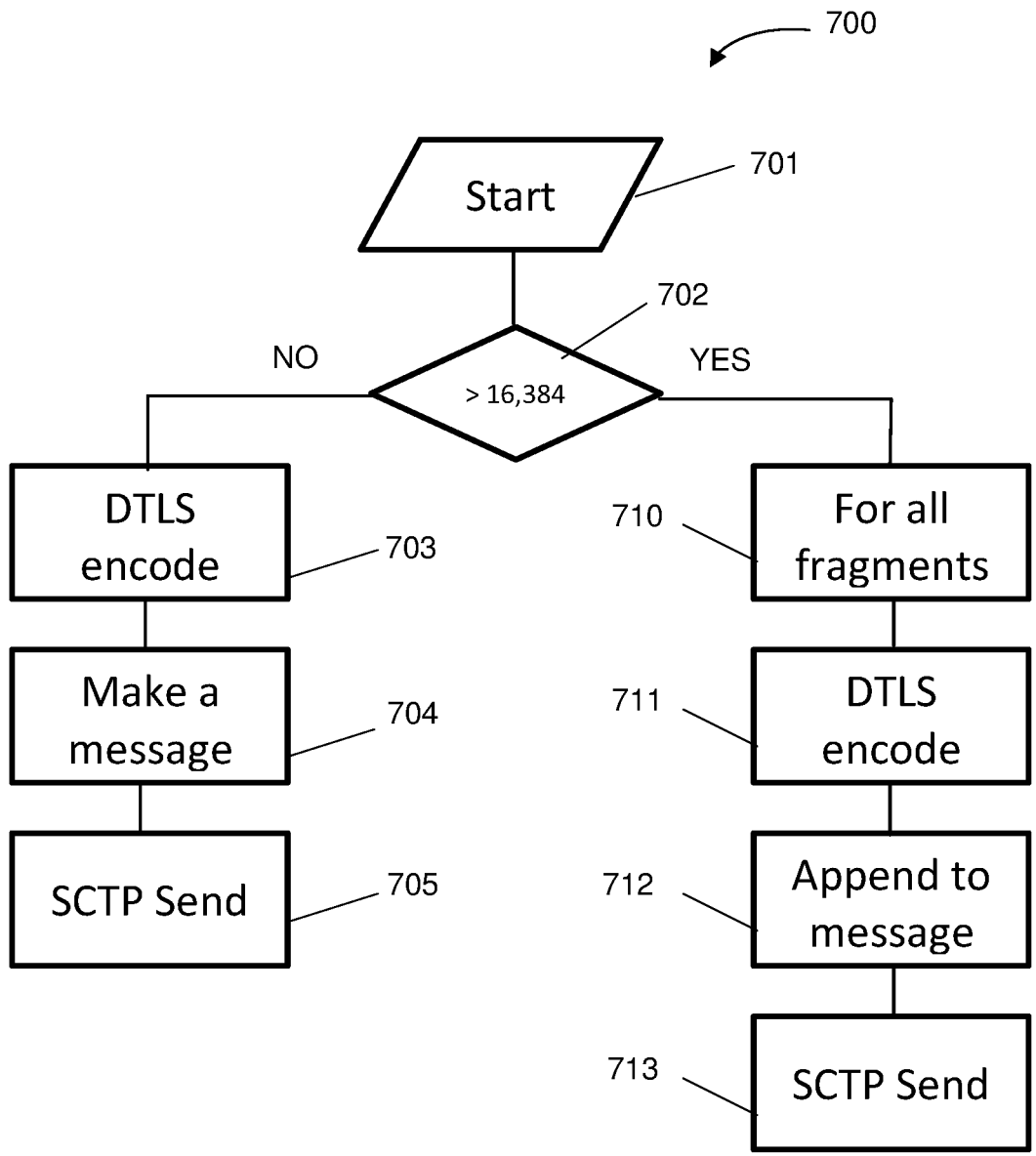
FIG. 7 illustrates a flow diagram at the first node to implement a legacy DTLS/SCTP or the enhanced DTLS/

FIG. 7 illustrates a flow diagram at the first node to implement a legacy DTLS/SCTP or the enhanced DTLS/SCTP technique for transmission of a message, according to some embodiments of the present disclosure. At the other end, FIG. 8 illustrates a flow diagram at the second node to implement a legacy DTLS/SCTP or the enhanced DTLS/SCTP technique in recovering a sent message, according to some embodiments of the present disclosure. With both methods 700 and 800 illustrated in FIG. 7 and FIG. 8, at the initialization of the SCTP association at INIT handshake, both end point peer nodes provide a set of SCTP Options. In some embodiments, if DTLS-SCTP indication and enabling SCTP-AUTH (RADOM; CHUNKS; HMAC-ALGO) are provided by both peers, then the enhanced DTLS/SCTP technique is enabled for the SCTP association, otherwise legacy SCTP association is started. As soon as the COOKIE-ECHO/COOKIE-ACK handshake of SCTP is finished, DTLS handshake is to be accomplished.

The method 700 is the message flow in the egress direction. After receipt of a message at operation 701, the first node determines if the messages length is equal to or less than 16,384 bytes (or some other selected limit) at operation 702. If the message is equal to or less than 16,384 bytes, the node uses the legacy technique to provide for a single DTLS record. The node encodes the message with DTLS at operation 703 to make a single DTLS encoded record at operation 704. The resulting record is passed to SCTP as a single message at operation 705 for being sent to the second node.

If the message is larger than 16,384 bytes (or some other selected limit), the method follows the right branch, in which enhanced DTLS/SCPT can be employed, provided both end nodes are capable to do so. At operation 710, the message is split into portions of 16,384 bytes (or less) fragments and each fragment is DTLS encoded on its own at operation 711. The DTLS encoded records resulting from encoding are combined (shown as appended message) at operation 712 and, at operation 713, the first node sends the resultant secure message to SCTP as a single message to the second node.

The method 800 is the message flow in the ingress direction. After receiving the DTLS/SCTP transmission from the first node at operation 801, the second node determines if the SCTP message contains only one single DTLS record at operation 802. If only one DTLS record, the method follows the left branch and, at operation 803, the node decodes the single record at operation 803. This single DTLS decoded forms the message at operation 804 and the node sends the result to the upper layer as a single message at operation 805.

Alternatively, in the ingress direction, if the SCTP message contains more than a single DTLS record, the method follows the right branch. The incoming message is defragmented into multiple DTLS fragments at operation 810. Each DTLS fragment is decoded by DTLS at operation 811 and the node combines the resultant decoded fragments (e.g., appended to form the message) at operation 812. A single message is sent to the upper layer (e.g., SCTP API) as the recovered message at operation 813.

A SCTP client that receives an INIT-ACK which doesn't contain the DTLS-supported message but do include the SCTP-AUTH parameters can attempt to perform a DTLS handshake. For an RFC 6083 client it is likely that the preferred HMAC-ALGO indicates SHA-1. The client performing fallback procedure can follow the capabilities indicated in the SCTP parameter if its policy accepts it.

In some embodiments, when performing the DTLS handshake, it can include the TLS extension "dtls_over_sctp_maximum_message_size". If the server includes that extension in its handshake message it indicates that the association may experience a potential attack where an on-path attacker has attempted to downgrade the response to RFC 6083 by removing the SCTP DTLS-Supported parameter. In this case the message limit is per the TLS extension and the client can continue per this disclosure. Otherwise, the continued processing will be per RFC 6083 and the message is limited to 16,384 bytes.

A SCTP server that receives an INIT which doesn't contain the DTLS-supported message but do contain the three parameters for SCTP-AUTH, i.e., RANDOM, CHUNKS, and HMAC-ALGO, could attempt to accept fallback to RFC 6083 if accepted by the policy. First an RFC 6083 client is likely preferring SHA-1 in HMAC-ALGO parameter for SCTP-AUTH.

If fallback is allowed, it is possible that the client will send plain text messages prior to DTLS handshake as it is allowed per RFC 6083. So that can be part of the consideration for a policy allowing fallback. When performing the DTLS handshake, the server can accept that lack of the TLS extension "dtls_over_sctp_maximum_message_size" and cannot treat it as fatal error. In case the "dtls_over_sctp_maximum_message_size" TLS extension is present in the handshake, the server can continue the handshake including the extension with its value also, and from that point, follow the description herein. In case the TLS option is missing, RFC 6083 applies.

FIG. 9 illustrates implementation of a network node, according to some embodiments of the present disclosure. In FIG. 9, the network node 900 can implement the functions of the system and the methods/procedures described in this disclosure. The network node 900 can be either the earlier-described first node (e.g., sending or egress node) which sends a message. The network node 900 can also be the earlier-described second node (e.g., receiving or ingress node) which receives the message. The network node 900 can also perform operations of both first and second nodes (e.g., both egress and ingress functions).

The network node 900 comprises processing circuitry (such as one or more processors) 901 and a non-transitory machine-readable storage medium, such as memory 902. The processing circuitry 901 (hereafter referred to as "processor" 901) provides the processing capability for the network node 900. The memory 902 can store instructions which, when executed by the processor 901, are capable of configuring the network node 900 to perform the methods described in the present disclosure. Hence, the methods 200 and 500 can be performed by computer programs, in which instructions of the program cause the node 900 to perform those described operations. The network node 900 implements functional blocks 910 and 920 to perform processing on message 903. The functional blocks 910 and 920 correspond respectively to functional blocks 110 and 120 shown in FIG. 1. The message 903 corresponds to the message received via SCTP API when the network node 900 operates in the egress mode to send, via SCTP, to another node; or the message 903 can be the recovered message, received via SCTP, to send uplink to the SCTP API when the network node 900 is in the ingress mode.

The memory can be a computer readable storage medium, such as, but not limited to, any type of disk 930 including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

The description of the disclosure herein describes an update for the usage of the DTLS protocol to protect messages sent over the SCTP. DTLS over SCTP provides mutual authentication, confidentiality, integrity protection, and replay protection for applications that use SCTP as their transport protocol and allows client/server applications to communicate in a way that is designed to give communications privacy, prevent eavesdropping, and detect tampering or message forgery. Applications using DTLS over SCTP can use all or almost all transport features provided by SCTP and its extensions. One intent of the disclosure is to obsolete RFC 6083 and remove the 16,384 byte limitation on message size by defining a more secure message fragmentation technique, so that multiple DTLS records can be used to protect a single message. It further updates the DTLS versions to use, as well as the HMAC algorithms for SCTP-AUTH, and simplifies the implementation by some stricter requirements on the establishment procedures.

In some embodiments, the usage applies to the DTLS protocol, as defined in I-D.ietf-tls-dtls13, over the SCTP, as defined in RFC4960 with Authenticated Chunks for SCTP (SCTP-Auth) in RFC4895. The enhanced DTLS/SCTP provides mutual authentication, confidentiality, integrity protection, and replay protection for applications that use SCTP as their transport protocol, allows client/server applications to communicate in a way that is designed to give communications privacy, prevents eavesdropping, and detects tampering or message forgery. Enhanced DTLS/SCTP uses DTLS for mutual authentication, key exchange with forward for SCTP-AUTH, and confidentiality of messages Enhanced DTLS/SCTP use SCTP and SCTP-AUTH for integrity protection and replay protection of messages.

Applications using DTLS over SCTP can use all or almost all transport features provided by SCTP and its extensions. In some embodiments, enhanced DTLS/SCTP supports:
  preservation of message boundaries;
  a large number of unidirectional and bidirectional streams;
  ordered and unordered delivery of SCTP messages;
  the partial reliability extension as defined in RFC3758;
  the dynamic address reconfiguration extension as defined in RFC5061; and
  large messages.

The method efficiently implements and supports larger messages and is also recommended for I-Data chunks as defined in RFC 8260, as well as an SCTP API that supports partial message delivery as discussed in RFC6458. The DTLS over SCTP solution defined in RFC 6083 had the limitation that the maximum message size is $2^{14}$ bytes (16,384 bytes), which is a single DTLS record limit.

In some embodiments, the described enhancement updates, replaces, or adds to RFC6083 defined properties with the following changes:
- removes the limitations on message size by defining a secure fragmentation mechanism;
- defines a DTLS extension for the endpoint nodes to declare the message size supported to be received;
- can mandate that more modern DTLS version may be required (DTLS 1.2 or 1.3);
- can mandate use of modern HMAC algorithm (SHA-256) in the SCTP authentication extension RFC4895;
- recommends support of RFC8260 to enable interleaving of large SCTP messages to avoid scheduling issues;
- recommends support of partial message delivery API, (see RFC6458) if larger messages are intended to be used; and
- can apply stricter requirements on always using DTLS for all messages in the SCTP association and by defining a new SCTP parameter peers can determine these stricter requirements apply, such as the requirement that messages that can be protected by DTLS are required to be protected by DTLS.

In some embodiments, a receiving endpoint (node) may be limited by the receiving buffer. Such endpoint may advertise its largest supported protected message using SCTP's mechanism for Advertised Receiver Window Credit (a_rwnd) as specified in RFC4960. However, in some embodiments a receiving endpoint (node) can support partial delivery of messages, in which case a_rwnd will not limit the maximum size of the DTLS protected message. This is due to the receiver having the ability to move parts of the DTLS protected message from the SCTP receiver buffer into a buffer for DTLS processing. When each complete DTLS record has been received from SCTP, it can, in its turn, be processed and the plain text fragment can, in its turn, be partially delivered to the user application.

Thus, in some instances, the limit of the largest message is dependent on buffering allocated for DTLS processing as well as the DTLS/SCTP API to the application. To ensure that the sender has some understanding of limitation on the receiver size, a TLS extension "dtls_over_sctp_maximum_message_size" can be used to signal the endpoints receiver capability when it comes to message size.

For legacy compatibility, implementation of the enhanced DTLS/SCTP should support messages of at least 16,384 bytes, where 16,384 bytes is the supported message size in the current RFC 6083. By requiring this message size, the enhanced method ensures compatibility with existing (legacy) usage of RFC 6083 and not requiring the upper layer protocol to implement additional features or requirements.

Due to SCTP's capability to transmit concurrent messages the total memory consumption in the receiver is not bounded. In cases where one or more messages are affected by packet loss of its DATA chunks, more data may require buffering in the receiver. The necessary buffering space for a single message of dtls_over_sctp_maximum_message_size (MMS) is dependent on the implementation.

When enhanced DTLS/SCTP is used with DTLS 1.2 (RFC6347), DTLS 1.2 can be configured to disable options known to provide insufficient security. HTTP/2 (RFC7540) gives good minimum requirements based on previously known attacks. DTLS 1.3 (I-D.ietf-tls-dtls13) only defines strong algorithms without major weaknesses. DTLS 1.3 requires rekeying before algorithm specific AEAD limits have been reached. HMAC-SHA-256, as used in SCTP-AUTH, has a very large tag length and very good integrity properties. Thus, where SHA-1 can be used in legacy mode, SHA-256 or higher can be used in the enhanced mode. Furthermore, in some embodiments, the enhanced DTLS/SCTP deployment can replace IPsec.

In some embodiments, the enhanced DTLS/SCTP maximum message size extension enables secure negation of a message size that fits in the DTLS/SCTP buffer, which improves security and availability.

In some embodiments, the enhanced DTLS/SCTP can be mutually authenticated. In some instances, it is recommended that the DTLS/SCTP is used with certificate-based authentication. All security decisions can be based on the peer's authenticated identity and not on its transport layer identity.

It is possible to authenticate DTLS endpoints based on Internet Protocol (IP) addresses in certificates. SCTP associations can use multiple IP addresses per SCTP endpoint. Therefore, it is possible that DTLS records will be sent from a different source IP address or to a different destination IP address than that originally authenticated. This is not a problem provided that no security decisions are made based on the source or destination IP addresses.

RFC 6973 suggests that the privacy considerations of the Internet Engineering Task Force (IETF) protocols be documented. For each SCTP message, the user also provides a stream identifier, a flag to indicate whether the message is sent ordered or unordered, and a payload protocol identifier. Although enhanced DTLS/SCTP provides privacy for the message, the other three information fields are not confidentiality protected. They are sent as clear text, because they are part of the SCTP DATA chunk header.

In some embodiments, it is recommended that the enhanced DTLS/SCTP is used with certificate based authentication in DTLS 1.3 (I-D.ietf-tls-dtls13) to provide identity protection. DTLS/SCTP can be used with a key exchange method providing Perfect Forward Secrecy. Perfect Forward Secrecy significantly limits the amount of data that can be compromised due to key compromise.

As required by RFC7258, work on IETF protocols needs to consider the effects of pervasive monitoring and mitigate them when possible. Pervasive monitoring is widespread surveillance of users. By encrypting more information, including user identities, DTLS 1.3 offers much better protection against pervasive monitoring. Massive pervasive monitoring attacks relying on key exchange without forward secrecy has been reported. By mandating perfect forward secrecy, enhanced DTLS/SCTP effectively mitigates many forms of passive pervasive monitoring and limits the amount of compromised data due to key compromise.

FIG. 10 illustrates a communication system, according to some embodiments of the present disclosure. The enhanced DTLS/SCTP technique described above can be implemented in one or more nodes of a communication system 1000 shown in FIG. 10. With reference to FIG. 10, in accordance with some embodiments, the communication system 1000 includes telecommunication network 1010, such as a 3GPP-type cellular network, which comprises access network 1011, such as a radio access network, and core network 1014. Access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

What is claimed is:

1. A method at a first node for encoding a message for secure transmission to a second node comprising:
    receiving the message for transmission to the second node;
    fragmenting the message into a plurality of fragments, wherein each fragment is of a selected size not exceeding a maximum supported byte size for a Datagram Transport Layer Security (DTLS) record format;
    encoding separately each fragment of the plurality of fragments using DTLS;
    combining DTLS encoded fragments into a single Stream Control Transmission Protocol (SCTP) message not limited by the maximum supported byte size for the DTLS record format; and
    transmitting the message as a plurality of DTLS encoded fragments in the single SCTP message to the second node.

2. The method according to claim 1, wherein the selected size of each fragment is less than or equal to 16,384 bytes.

3. The method of claim 1, wherein the combining the DTLS encoded fragments comprises appending the DTLS encoded fragments.

4. The method according to claim 1 further comprising:
    in response to a handshake communication with the second node, receiving an indication from the second node that the second node is capable of combining a number of the DTLS encoded fragments into one SCTP message.

5. The method according to claim 4 further comprising:
    receiving an indication indicating a maximum message size for the combined DTLS encoded fragments.

6. The method according to claim 1 further comprising:
    prior to fragmenting the message, determining whether the second node is capable of receiving more than one fragment in the single SCTP message; and
    transmitting the plurality of DTLS encoded fragments in the single SCTP message to the second node, when the second node is capable of receiving the plurality of fragments in one SCTP message.

7. A first node to encode a message for secure transmission to a second node, the first node comprising:
    a processor; and
    a memory comprising instructions which, when executed by the processor, cause the first node to:
        receive the message for transmission to the second node;
        fragment the message into a plurality of fragments, wherein each fragment is of a selected size not exceeding a maximum supported byte size for a Datagram Transport Layer Security (DTLS) record format;
        encode separately each fragment of the plurality of fragments using DTLS;
        combine DTLS encoded fragments into a single Stream Control Transmission Protocol (SCTP) message not limited by the maximum supported byte size for the DTLS record format; and
        transmit the message as a plurality of DTLS encoded fragments in the single SCTP message to the second node.

8. The first node according to claim 7, wherein the selected size of each fragment is less than or equal to 16,384 bytes.

9. The first node according to claim 7, wherein to combine the DTLS encoded fragments comprises to append the DTLS encoded fragments.

10. The first node according to claim 7, wherein the first node further to:
    in response to a handshake communication with the second node, receive an indication from the second node that the second node is capable of combining a number of the DTLS encoded fragments into one SCTP message.

11. The first node according to claim 10 further comprising:
    receive an indication indicating a maximum message size for the combined DTLS encoded fragments.

12. The first node according to claim 7, wherein the first node further to:
    prior to fragmenting of the message, determine whether the second node is capable of receiving more than one fragment in the single SCTP message; and transmit the plurality of DTLS encoded fragments in the single SCTP message to the second node, when the second node is capable of receiving the plurality of fragments in one SCTP message.

13. A method at a second node for decoding a secure message received from a first node comprising:
receiving a single Stream Control Transmission Protocol (SCTP) message from the first node;
determining that the single SCTP message comprises a plurality of Datagram Transport Layer Security (DTLS) encoded fragments;
defragmenting the single SCTP message into a plurality of fragments, wherein each fragment is of a selected size and separately encoded using DTLS;
decoding separately each fragment of the plurality of fragments using DTLS, wherein each fragment does not exceed a maximum supported byte size for a DTLS record format, but wherein the single SCTP message is not limited by the maximum supported byte size for the DTLS record format; and
combining decoded fragments to retrieve the secure message.

14. The method according to claim 13, wherein the selected size of each fragment is less than or equal to 16,384 bytes.

15. The method according to claim 13 further comprising:
in response to a handshake communication with the first node, sending an indication from the second node to the first node that the second node is capable of combining a number of the DTLS encoded fragments into one SCTP message; and
receiving in the single SCTP message the DTLS encoded fragments.

16. The method according to claim 15 further comprising:
prior to receiving the single SCTP message, sending an indication from the second node to the first node, an indication indicating a maximum message size for the SCTP message containing the DTLS encoded fragments.

17. A second node to decode a secure message received from a first node, the second node comprising:
a processor; and
a memory comprising instructions which, when executed by the processor, cause the second node to:
receive a single Stream Control Transmission Protocol (SCTP) message from the first node;
determine that the single SCTP message comprises a plurality of Datagram Transport Layer Security (DTLS) encoded fragments;
defragment the single SCTP message into a plurality of fragments, wherein each fragment is of a selected size and separately encoded using DTLS;
decode separately each fragment of the plurality of fragments using DTLS, wherein each fragment does not exceed a maximum supported byte size for a DTLS record format, but wherein the single SCTP message is not limited by the maximum supported byte size for the DTLS record format; and
combine decoded fragments to retrieve the secure message.

18. The second node according to claim 17, wherein the selected size of each fragment is less than or equal to 16,384 bytes.

19. The second node according to claim 17 further comprising:
in response to a handshake communication with the first node, send an indication from the second node to the first node that the second node is capable of combining a number of the DTLS encoded fragments into one SCTP message; and
receive in the single SCTP message, the DTLS encoded fragments.

20. The second node according to claim 19 further comprising:
prior to receiving the single SCTP message, send an indication from the second node to the first node, an indication indicating a maximum message size for the SCTP message containing the DTLS encoded fragments.

* * * * *